(12) United States Patent
Milne et al.

(10) Patent No.: US 10,989,061 B2
(45) Date of Patent: Apr. 27, 2021

(54) TIP MACHINING METHOD AND SYSTEM

(71) Applicant: Siemens Aktiengesellschaft, Munich (DE)

(72) Inventors: Trevor Milne, Sheffield (GB); Kieran Tatton, Lincoln (GB)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/340,122

(22) PCT Filed: Oct. 17, 2017

(86) PCT No.: PCT/EP2017/076415
§ 371 (c)(1),
(2) Date: Apr. 7, 2019

(87) PCT Pub. No.: WO2018/073210
PCT Pub. Date: Apr. 26, 2018

(65) Prior Publication Data
US 2020/0011195 A1   Jan. 9, 2020

(30) Foreign Application Priority Data

Oct. 21, 2016   (EP) .................................... 16195032

(51) Int. Cl.
*F01D 11/14*   (2006.01)
*B23P 6/00*   (2006.01)
(Continued)

(52) U.S. Cl.
CPC .............. *F01D 11/14* (2013.01); *B23P 6/002* (2013.01); *F01D 5/005* (2013.01); *B24B 5/36* (2013.01);
(Continued)

(58) Field of Classification Search
CPC .......... B23P 6/002; B23P 6/045; B23P 15/02; F05D 2230/72; F05D 230/80; F05D 2230/10; F01D 5/005; F01D 11/14
See application file for complete search history.

(56) References Cited

U.S. PATENT DOCUMENTS

| 4,501,095 A | 2/1985 | Drinkuth et al. |
| 5,704,826 A | 1/1998 | De Luis Vizcaino |
| (Continued) | | |

FOREIGN PATENT DOCUMENTS

| CN | 1798634 A | 7/2006 |
| CN | 101457655 A | 6/2009 |
| (Continued) | | |

OTHER PUBLICATIONS

International search report and written opinion dated Jan. 22, 2018 for corresponding PCT/EP2017/076415.

*Primary Examiner* — Christopher J Besler

(57) ABSTRACT

A method of machining a tip profile of a blade for a turbomachine includes coupling the blade to a component of the turbomachine; supporting the component on a machining apparatus, the machining apparatus being configured to remove material from the blade according to a cutting path defined within a coordinate system of the machining apparatus, wherein the component is supported such that a datum axial end face of the component is aligned with a datum of the coordinate system of the machining apparatus; and machining the blade according to the cutting path. A system for machining a tip profile of a blade for a turbomachine accomplishes the method.

11 Claims, 7 Drawing Sheets

(51) Int. Cl.
  *F01D 5/00*  (2006.01)
  *B24B 5/36*  (2006.01)
  *F01D 25/28*  (2006.01)

(52) U.S. Cl.
  CPC ........ *F01D 25/285* (2013.01); *F05D 2230/14* (2013.01); *F05D 2230/80* (2013.01)

(56) References Cited

U.S. PATENT DOCUMENTS

| | | |
|---|---|---|
| 7,074,012 B2 | 7/2006 | Nishimura et al. |
| 8,083,476 B2 | 12/2011 | Guimbard et al. |
| 9,969,055 B2 | 5/2018 | Groppe et al. |
| 2014/0134926 A1* | 5/2014 | Groppe .................. B24B 19/14 451/28 |
| 2015/0158133 A1* | 6/2015 | Cheah ..................... B23P 15/02 416/223 B |

FOREIGN PATENT DOCUMENTS

| | | |
|---|---|---|
| EP | 1875986 A1 | 1/2008 |
| EP | 2730370 A1 | 5/2014 |
| JP | 2014098389 A | 5/2014 |
| RU | 2228250 C2 | 5/2004 |

\* cited by examiner

TIP MACHINING METHOD AND SYSTEM

CROSS REFERENCE TO RELATED APPLICATIONS

This application is the US National Stage of International Application No. PCT/EP2017/076415 filed Oct. 17, 2017, and claims the benefit thereof. The International Application claims the benefit of European Application No. EP16195032 filed Oct. 21, 2016. All of the applications are incorporated by reference herein in their entirety.

TECHNICAL FIELD

The present disclosure relates to a method of and system for tip machining rotor and stator blades of a turbomachine and is particularly, although not exclusively, concerned with a tip machining method or system to reduce the variation in blade tip clearances.

BACKGROUND

When manufacturing blades, e.g. rotor blades and stator blades, for axial turbomachines it is desirable to achieve accurate and consistent clearances between the tips of the blades and a corresponding casing or rotor of the turbomachine that is adjacent to the tip of the blade when the turbomachine is operating. Reducing the tip clearance may improve the efficiency of the turbomachine, as gases passing through the turbomachine may be encouraged to pass between aerofoils of the rotor and stator blades, rather than passing over the tips of the blades. It may therefore be desirable to minimise tip clearances. However, if the tip clearances are too small, the tip of the blade may rub against the rotor or casing during operation of the turbomachine, which may be undesirable.

In order to improve tip clearance accuracy and consistency, blades are typically manufactured with a length that is greater than the expected nominal length of the blade. The blades are then assembled into the rotor or casing of the turbomachine and the tips of the blades are machined using a previously proposed tip machining method such that a distance between the leading edge tips of diametrically opposed blades is equal to a predetermined distance.

The predetermined distance between the blade tips may be determined by considering the expected axial position of the tips of the blades within the assembled turbomachine and the diameter of a gas path of the turbomachine at the expected axial position. The expected axial position may be determined by considering the nominal dimensions of each of the components of the turbomachine.

With reference to FIG. 1, due to manufacturing tolerances that are applied to dimensions of a blade, e.g. rotor blade 10, such as the chord length, aerofoil twist angle, etc., and the rotor that the blade is coupled to, the axial position of the leading edge of the blade may vary. In FIG. 1, the rotor blades are shown in three different positions, a first blade 10a is shown in a maximum forward position, a second blade 10b is shown in a nominal position and a third blade 10c is shown in a maximum rearward position.

As depicted in FIG. 1, by using the previously proposed machining method, the leading edge tip 12a, 12b, 12c of the blade may be machined to the same diameter d regardless of the axial position of the blade. Hence, the tip clearances 14a, 14b, 14c that are created between the blade tips 12a, 12b, 12c and the casing 20 may vary depending on the axial position of the leading edge of the blades 10. In other words, the tip clearance of the blades may be affected by the manufacturing tolerances applied to the blades that may affect the axial position of the leading edge of the blade when assembled onto the turbomachine.

It is often desirable for the blades of turbomachines to be refurbished after a period of operation of the turbomachine. Refurbishing the blade may involve the removal of material from the leading edge of the blade and/or the blade tip. After refurbishing the blade and reinstalling the blade into a turbomachine, the axial and/or radial position of the blade may have changed. Hence, it may be desirable to repeat the process of machining the tip of the blade. If the position, e.g. the axial position, of the leading edge tip of the blade changes during refurbishment, and the blade tip is then machined such that the distance between diametrically opposed blade tips is once again equal to the predetermined distance, the tip clearance will also be affected.

In some cases, when material is removed from the blade during refurbishment, the shape of the blade may be outside the tolerances allowed for newly manufactured blades. The variation of tip clearances of refurbished blades may therefore be greater than for newly manufactured blades, which may reduce the efficiency of turbomachines that are fitted with refurbished blades.

U.S. Pat. No. 5,704,826 discloses a machine for grinding the rotor blades of an aeronautical engine is equipped with a CNC control and its header is a rotatable header provided with at least two grinders of different abrasive materials, wherein each of them is coupled to the header for being selected and then positioned in contact with the different stage blades with the cooperation of the CNC. The machine for grinding also includes a measuring unit fixed to the machine bed for controlling the radius of the blade stage, slides to displace the header in two directions and equipment to rotate the header an angle about its central transverse axis. The CNC has registered the values of the grinder diameters and the fixed position data of the respective grinder profile relative to the central axis.

EP1875986 discloses a method for contour grinding wide blades at high speed, according to which a wheel is used the grinding contour of which has a width dimension that is less than the width of the tip of the blades to be ground, said contour being defined by a straight area followed by an arched area at one end, with the straight area of which a straight grinding is carried out to deburr the tip of the blades, whereas with the arched area the contour grinding is carried out by rotating the grinding wheel relative to the blades.

EP2730370 discloses a method involving removing a housing part exposing rotor blades to be machined. A grinding device is arranged in a region of a rotor blade to be machined such that a tip of the blade is machined by using a grinding disk of the device. The machining region is screened off by arranging a screening device to counter a release of grinding dust from the screened-off region. Suction extraction is provided such that the extraction extracts the dust from the screened-off region. The tip of the blade is grinded in-situ for producing predetermined radial gap width.

It is therefore desirable for a method of machining the tips of blades to be provided that improves the accuracy and consistency of blade tip clearances, particularly for refurbished blades.

SUMMARY OF INVENTION

According to an aspect of the present disclosure, there is provided a method of machining, e.g. grinding, a tip profile of a blade for a turbomachine (such as an axial turbomachine), the method comprising: coupling the blade to a component of the turbomachine; supporting the component on a machining apparatus, the machining apparatus being configured to remove material from the blade according to a cutting path defined within a coordinate system of the machining apparatus, wherein the component is supported such that a datum axial end face of the component is aligned with a datum of the coordinate system of the machining apparatus; defining the cutting path relative to the datum of the coordinate system and machining the blade according to the cutting path.

The datum axial end face may be perpendicular to a longitudinal axis of the component. The datum axial end face may be a thrust bearing abutment face, against which a thrust bearing of the turbomachine abuts and transfers axial load, e.g. between a rotor and a casing of the turbomachine.

The method may comprise defining the cutting path by offsetting a portion of a gas path of the turbomachine by a desired tip clearance amount, e.g. in a direction perpendicular to the gas path at that location. The gas path may be defined relative to the datum axial end face of the component.

By machining the tip profile of the blade according to an offset of the turbomachine gas path relative to a suitable datum, the tip clearance, e.g. between the blade tip and an adjacent component the turbomachine, e.g. a casing, can be controlled more consistently.

The cutting path may extend between an upstream cutting point and a downstream cutting point. The upstream cutting point may be upstream of a leading edge of the blade. The downstream cutting point may be downstream of a trailing edge of the blade. The terms upstream and downstream may refer to the positions of the points with respect to a flow of gas through the turbomachine.

The upstream and downstream cutting point may be defined such that the cutting path may be suitable for machining blades across substantially all desirable manufacturing and assembly tolerances. Furthermore, redesigning the blade to increase chord width and/or change, e.g. reduce, aerofoil twist may not require the cutting path to be redefined.

The method may further comprise measuring the tip of the blade at upstream and downstream measurement points. The upstream and downstream measurement points may be defined on the cutting path. The upstream measurement point may be downstream of the leading edge of the blade. The downstream measurement point may be upstream of the trailing edge of the blade.

The upstream and downstream measurement points may be downstream and upstream of the leading and trailing edges of the blade respectively at substantially all manufacturing tolerances of the blade and the component. In this way, the measurement points may be defined such that a probe may be positioned on the blade tip at the measurement points in order to verify the accuracy of the blade tip profile.

The distance between the leading and trailing edges of the blade and the upstream and downstream measurement points respectively may be greater than the maximum variation in the position of the leading and trailing edges, e.g. according to the manufacturing and assembly tolerances of the blade, such that the same measurement points may be used with re-designed blades having a different, e.g. smaller, chord length and/or aerofoil twist.

The method may further comprise manufacturing the blade such that the length of the blade is greater than a desired final length of the blade, e.g. the expected final length of the blade following tip machining of the blade. The additional length of the blade may be configured such that material may be removed over substantially the complete chord length of the blade in order to achieve a desired blade tip clearance when the blade and/or component have been manufactured to any allowable manufacturing tolerance.

The blade may be a refurbished blade. For example, the method may comprise removing the blade from an assembled turbomachine, e.g. a turbomachine that has previously been assembled and operated. The method may further comprise refurbishing the blade by removing material from at least one of the leading edge and the tip of the blade prior to the blade being coupled to the component of the turbomachine.

The tip of the refurbished blade may be machined using the same cutting path as a new blade. This may remove the need for recalibration of the machining apparatus. By implementing the present invention, the tip clearance of the refurbished blade may be the same, regardless of whether the dimensions of the refurbished blade are within the tolerances of a newly manufactured blade.

The method may comprise subsequently refurbishing the blade by removing material from at least one of the leading edge and the tip of the blade. The method may further comprise supporting the component on the machining apparatus, wherein the component is supported such that the datum axial end face of the component is aligned with the datum of the coordinate system of the machining apparatus. The refurbished blade may be machined to the cutting path, e.g. the same cutting path used to machine the original manufactured blade.

By applying the method of the present invention, the blade may be removed from the turbomachine, refurbished, reinstalled in the turbomachine and the tip may be re-machined to the same cutting path in order to provide the same tip clearance. It may therefore be unnecessary to recalibrate or reprogram the machining apparatus to achieve the same tip clearance for the refurbished blade.

The method may comprise removing a previous blade from the component. The previous blade may have been designed with a leading edge tip position that is different from the blade to be machined. The cutting path used to machine the blade may be the same as a previous cutting path used to machine the tip profile of the previous blade.

It is sometimes desirable to re-design the blades of a turbomachine and to replace the existing blades in a previously assembled turbomachine with the redesigned blades. By applying the method of the present invention, the tips of the redesigned blades may be machined using the same cutting path, in order to achieve the same tip clearances.

The component may comprise a rotor of the turbomachine or a casing of the turbomachine. The rotor or the casing may be configured to be assembled with the other of the casing and the rotor relative to the datum axial end face.

For example, the datum axial end face may be a bearing face of the rotor, e.g. a face configured to interface with a thrust bearing of the rotor. The axial position of the rotor relative to the casing may be set according to the position of the datum axial end face. By machining the tips of the blades relative to the datum axial end face of the rotor used to position the rotor relative to the casing, the accuracy of the blade tip clearances may be improved further.

The method may further comprises coupling a plurality of blades to the component, such that the blades are arranged in a plurality of stages spaced axially along the component. Each of the blades may be machined according to the cutting path.

In this way, all of the blades coupled to a rotor or a casing of the turbomachine in each of the stages of the turbomachine may be machined relative to the datum axial end face of the rotor or casing. This may allow the clearance of all of the blades to be improved when the rotor is assembled into the casing.

At least one of the blades may comprise a compressor blade and at least one of the blades may comprise a turbine blade.

The component may comprise a rotor or a casing of the turbomachine. The method may further comprise assembling a rotor of the turbomachine into a casing of the turbomachine. The rotor and the casing may be located relative to one another according to the position of the datum axial end face.

The component may comprise at least one of: a low pressure compressor rotor, a high pressure compressor rotor, a turbine rotor, a low pressure compressor casing, a high pressure compressor casing and a turbine casing. For example, the component may be an assembly of a low pressure and a high pressure compressor rotor. In some arrangements, the component may be an assembly of the low pressure and/or high pressure compressor rotors and a turbine rotor.

According to another aspect of the present disclosure, there is provided a method of controlling tip clearance of a turbomachine, the method comprising: coupling a plurality of blades to a component of the turbomachine, such that the blades are arranged in a plurality of stages spaced axially along the component; supporting the component on a machining apparatus, the machining apparatus being configured to remove material from the blades according to a cutting path defined within a coordinate system of the machining apparatus, wherein the component is supported such that a datum axial end face of the component is aligned with a datum of the coordinate system of the machining apparatus; defining the cutting path relative to the datum of the coordinate system; and machining the blades according to the cutting path.

The method may further comprise defining the cutting path by offsetting a plurality of portions of the gas path of the turbomachine by a desired tip clearance amount. The gas path may be defined relative to the datum axial end face of the component. The component may comprise a rotor or a casing of the turbomachine.

According to another aspect of the present disclosure, there is provided a system for machining a tip profile of a blade for a turbomachine, the system comprising: a component of a turbomachine configured to allow a blade of the turbomachine to be coupled to the component, wherein a gas path of the turbomachine is defined relative to a datum axial end face of the component; and a machining apparatus, the machining apparatus being configured to remove material from the blade according to a cutting path defined within a coordinate system of the machining apparatus, the machining apparatus comprising a support structure configured to allow the component to be supported such that the datum axial end face of the component is aligned with a datum of the coordinate system of the machining apparatus, the cutting path being defined relative to the datum of the coordinate system.

The support structure of the machining apparatus may comprise a corresponding axial end face configured to abut the datum axial end face of the component when the component is supported by the support structure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

The above mentioned attributes, features, and advantages of this invention and the manner of achieving them, will become more apparent and understandable (clear) with the following description of embodiments of the invention in conjunction with the corresponding drawings, wherein.

DETAILED DESCRIPTION

Figure 2:
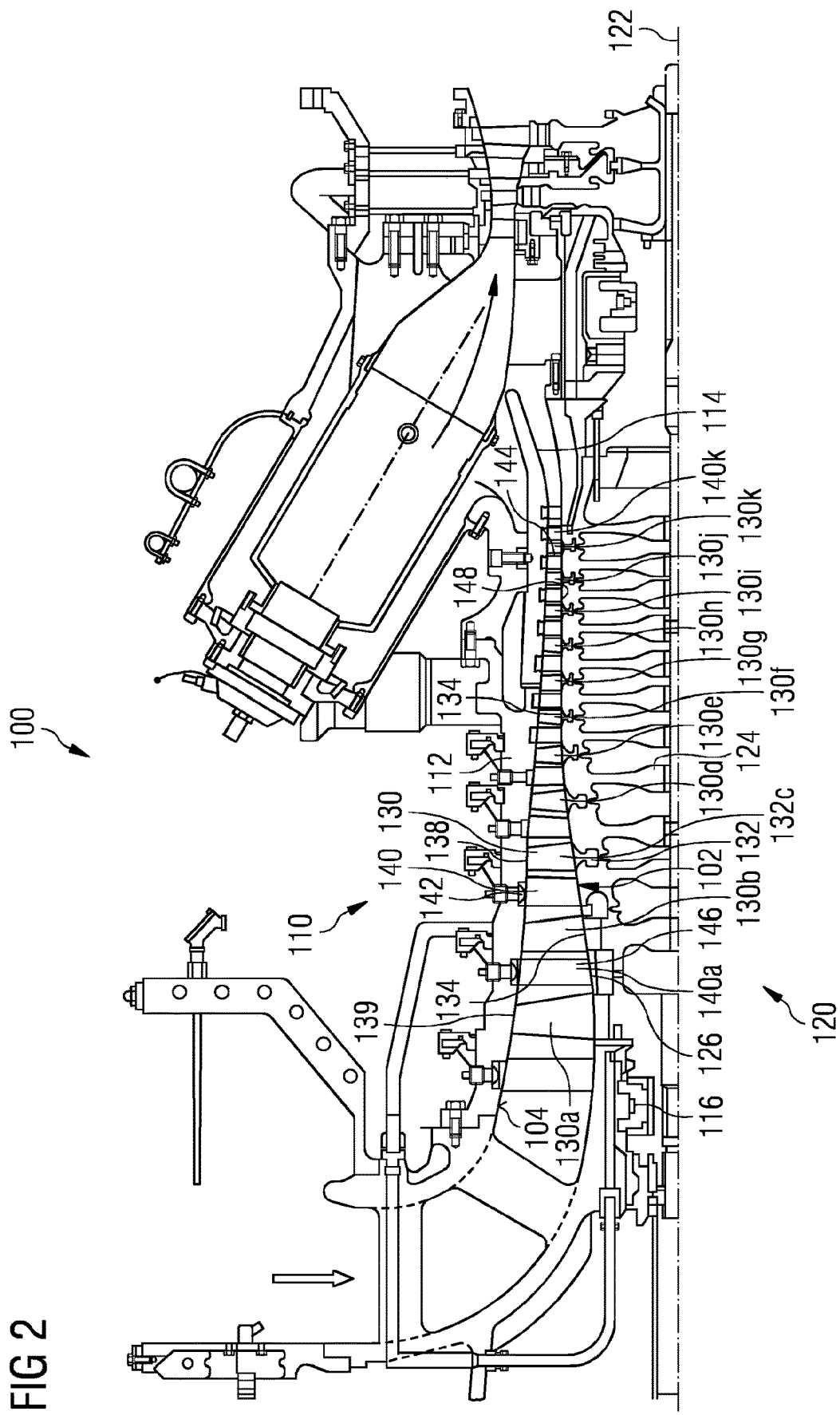
FIG. 2 is a cross sectional view of a previously proposed turbomachine.

With reference to FIG. 2, a turbomachine, such as a compressor 100 comprises a casing assembly 110, comprising a Low Pressure (LP) casing 112 and a High Pressure (HP) casing 114, and a rotor assembly 120. The rotor assembly 120 is supported within the casing assembly 110 by bearings 116 and configured to rotate about a central axis 122 of the rotor.

The rotor assembly 120 may comprise a plurality of discs 124. The discs 124 may support a plurality of rotor blades 130 arranged circumferentially about the rotor assembly 120. The turbomachine may comprise one or more stages 130a-130k of rotor blades 130 spaced axially along the rotor assembly 120.

Each rotor blade 130 may comprise a rotor blade root 132 configured to be coupled to the rotor assembly 120, a rotor blade aerofoil 136 and a rotor blade tip 138 located adjacent to the casing assembly, e.g. to the LP and/or HP casing 112, 114. The rotor blade may further comprise a rotor blade platform 134. The rotor blade platform may define a portion of an inner gas path 102 of the turbomachine.

In the arrangement depicted in FIG. 2, the rotor blades 130 are shroudless rotor blades. An outer gas path 104 of the turbomachine is therefore defined by the casing 112, 114 at each of the stages 130a-130k of rotor blades. A rotor blade tip clearance 139 may be defined by a distance between the tip 138 of the rotor blades and the casing 112, 114, e.g. perpendicular to the blade tip and/or casing at that location.

The turbomachine 100 further comprises a plurality of stator blades 140. The stator blades may be coupled to the casing assembly 110 and arranged circumferentially around the cases to form one or more stages, such as 140a,140k, of stator blades. Each stage of stator blades may be provided downstream of, e.g. immediately downstream of, a stage of rotor blades.

A first end 142 of each stator blade may be coupled to the casing and a stator blade aerofoil 146 may extend from the first end to a stator blade tip 148 arranged adjacent to the rotor assembly 120. The rotor assembly 120 may comprise one or more seal components 126 that are position adjacent to the tips 148 of the stator blades. Alternatively, the stator blade tips 148 may be positioned adjacent to a disc 124 of the rotor assembly. A stator blade tip clearance 149 may be defined as a distance between the tip of the stator blade and the seal component 126 or disc 124, e.g. perpendicular to the blade tip, disc and/or seal component at that location.

The stator blades 140 may comprise a stator blade platform 144 and the outer gas path 104 of the turbomachine at the stator blade stage may be defined by the stator blade platform 144. Alternatively, the stator blade 140 may not comprise a platform and the outer gas path 104 may be defined by the casing 112, 114. In some arrangements, such as that depicted in FIG. 2, the stator blades 140 provided in one or more of the stages 140a-140k may comprise platforms 144 and the stator blades provided in one or more others of the stages may not comprise platforms.

When the turbomachine 100 begins operating, the temperature of the components of the turbomachine may begin to increase. The components may heat up at different rates. For example, the temperature of the rotor and stator blades 130, 140 may increase more quickly than the temperature of the casings 112, 114 and the discs 124. Hence, as each of the components of the turbomachine heat up to an operating temperature, the clearances between the rotor and stator blade tips 138, 148, and the casing assembly 110 and rotor assembly 120 respectively may vary. It may therefore be desirable for the size of the clearances 139, 149 provided between the rotor and stator blade tips 138, 148, and the casing assembly 110 and rotor assembly 120 respectively to be configured to account for the relative changes in the dimensions of the components as the turbomachine heats up to the operating temperature.

Figure 1:
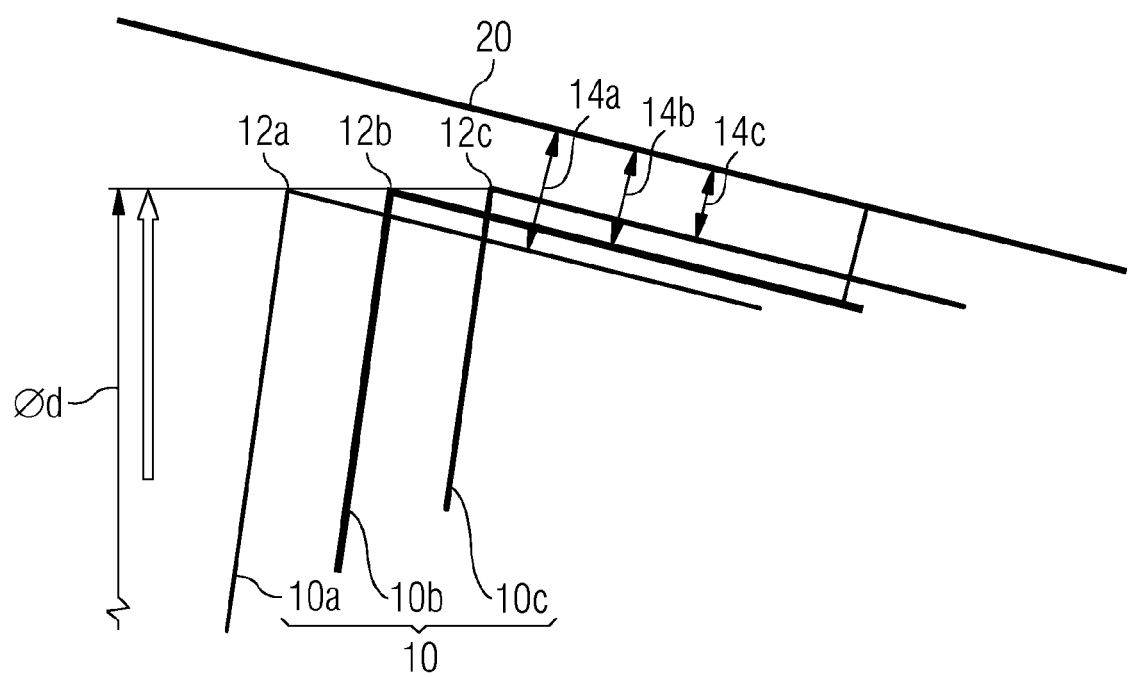
FIG. 1 is a partial cross sectional view through a turbomachine showing three blades manufactured to different sizes within manufacturing tolerances applied to the blades, the tips of the blades having been machined according to a previously proposed method.

Additionally, as depicted in FIG. 1 and described above, the clearance that is set when the tip profile of the blades is machined using the previously proposed tip machining method may vary depending on the axial position of the blade tips 138, 148 when the rotor or stator blades 132, 140 are assembled onto the rotor 130 or casing 112, 114. Hence, when using the previously proposed method, this variation in tip clearance may also be accounted for when setting a nominal clearance.

Figure 3:
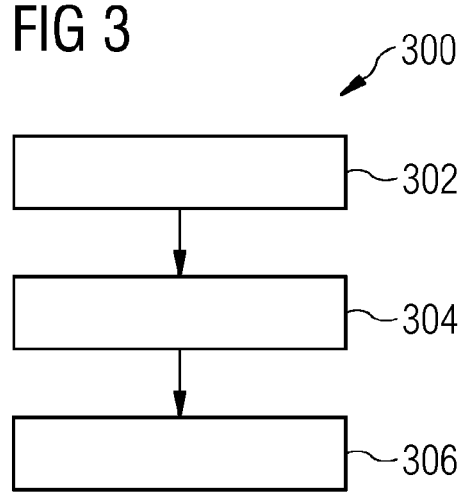
FIG. 3 shows a method of tip machining a blade or vane of a turbomachine according to arrangements of the present disclosure.

With reference to FIG. 3, in order to improve the accuracy and consistency of the clearances provided between the rotor blade tips and the casing or between the stator blade tips and the rotor assembly, and/or to allow the clearance to be reduced, the tip profiles of the blades, e.g. a stage of rotor blades or a stage of stator blades, may be machined using a method 300, according to arrangements of the present disclosure.

The method comprises a first step 302 in which the blade, e.g. the stator blade or rotor blade, is coupled to a component of the turbomachine. If the blade is a stator blade, the component may be a casing, such as an LP or HP compressor casing, or an assembly comprising two or more casings. Alternatively, if the blade is a rotor blade, the component may be a disc 124 of the rotor assembly, or an assembly comprising a plurality of discs, although in some arrangements, the component may be the rotor assembly 120.

Figure 4:
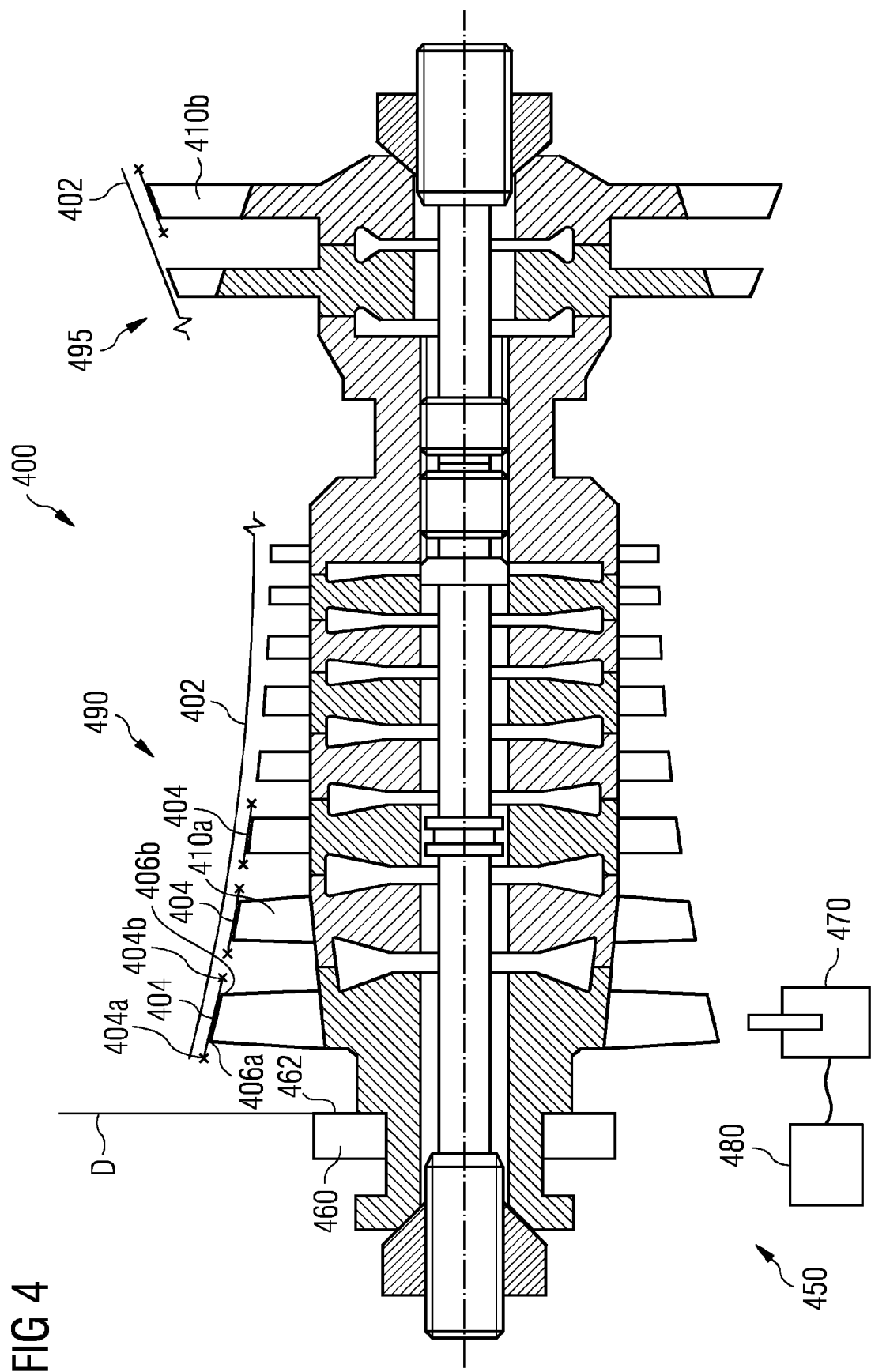
FIG. 4 is a cross sectional view of a rotor for a turbomachine and a machining apparatus according to arrangements of the present disclosure, a gas path of the turbomachine and portions of a cutting path used to machine the tips of the rotor blades are also shown.

With reference to FIG. 4, a machining apparatus such as a computer controlled machining apparatus 450, such as a computer numerically controlled apparatus, may be provided to machine the tips of the blades to a desired tip profile.

The machining apparatus 450 may comprise a support 460, such as a vice, clamp and/or chuck, adapted to support the component on the machining apparatus.

The machining apparatus 450 may further comprise a cutting tool 470, which may be moved by the machining apparatus along a cutting path to remove material from the blade. Alternatively, the cutting tool 470 may remain stationary, and the support 460 may be moved in order to translate the component relative to the cutting tool 470. Alternatively again, the cutting tool and the support 460 may both move in order to achieve a desired relative movement between the cutting tool and the support.

The machining apparatus 450 may further comprise a computing apparatus 480 configured to allow the cutting path to be input to the machining apparatus. The cutting path may be stored in a memory associated with the machining apparatus. For example, the memory may be provided within the computing apparatus.

Movement of the cutting tool 470 and/or support 460 of the machining apparatus may be performed with reference to a coordinate system of the machining apparatus 450. The support 460 may define a datum 462 within the coordinate system. The datum 462 may be defined by an axial end face of the support 460. The datum 462 may correspond to an origin of the coordinate system. Alternatively, the datum may be offset from the origin. When the cutting path is input to the machining apparatus, e.g. using a computer numerical control system, the cutting path may be defined within the coordinate system of the machining apparatus relative to the datum 462 or origin.

With reference to FIG. 3, the method may comprise a second step 304, in which the component is supported on the machining apparatus, e.g. using the support 560, such that a datum face D of the component, shown in FIG. 4, is aligned with the datum 462 of the machining apparatus. The support 460 of the machining apparatus may be configured such that the component may be held with the datum face of the component aligned with the datum 462. For example, the support may comprise a corresponding datum face, which is aligned with the datum 462, and the datum face of the component may abut the corresponding datum face when the component is supported on the machining apparatus.

The method comprises a third step 306, in which the blade is machined using the cutting path to provide the desired tip profile.

Figure 5:
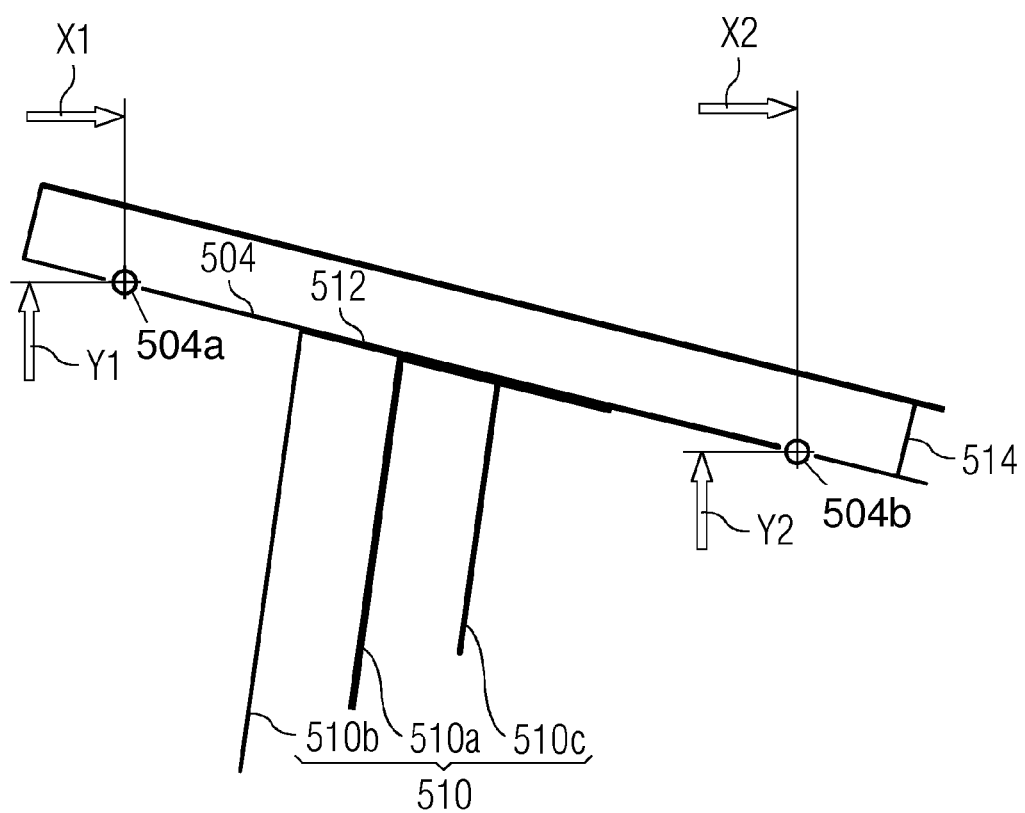
FIG. 5 is a partial cross sectional view through a turbomachine showing three blades manufactured to different sizes within manufacturing tolerances applied to the blades, the tips of the blades having been machined according to the method according to the present disclosure.

With reference to FIG. 5, using the method 300, the tips 512 of the blades 510 are machined according to a cutting path 504 defined relative to the datum face of the component to which the blades are coupled. The tip profile of the blade may therefore be the same regardless of whether the blade is in a nominal position 510a, or an upstream or downstream position 510b, 510c. In other words, the tip profile may be independent of the axial position of the leading edge tip of the blade. Hence, as shown in FIG. 4, the tip clearance 514 may be independent of the axial position of the leading edge of the blade. The tip clearance 514 is therefore unaffected by manufacturing tolerances of the blade or the component that affect the position of the leading edge. Furthermore, the tip clearance 514 is unchanged if the shape of the blade is outside of the manufacturing tolerances, for example, if material has been removed from the leading edge and/or tip of the blade during refurbishment of the blade.

In FIG. 5 the cutter path 504 has an upstream cutting point 504*a* and a downstream cutting point 504*b* each having axial and radial coordinates X1, Y1 and X2, Y2 respectively. These co-ordinates of the cutting path 504 are derived from an axial position or distance X1, X2 from the datum face D and a radial position Y1, Y2 from the datum face D or a point on the datum face D or relative to the rotational axis 122 of the blade assembly or turbomachine. Alternatively, these co-ordinates of the cutting path 504 are derived from an axial position or distance X1, X2 and/or radial position or distance Y1, Y2 from the datum axial end face of the component.

With reference to FIG. 4, a gas path 402 of a turbomachine 400 may be defined relative to the datum face D. As shown in FIG. 4, the datum face D may be an axial end face of the component arranged perpendicular to a longitudinal axis of the component.

A cutting path 404, or one or more portions of a cutting path, may be defined by offsetting the gas path 402, or one or more portions of the gas path, by a desired tip clearance. When the method 300 described above is used to machine the tips of blades, such as compressor blades 410*a* and/or turbine blades 410*b*, the datum 462 of the machining apparatus may be aligned with the datum face D in the second step 304, and the tip profile of the blades may be machined using the cutting path 404. In this way, the tip profile of the blades may be machined with an accurate and consistent clearance between the blade tips and the gas path, regardless of the axial position of the leading edge tip of the blades.

The desired tip clearance may correspond to the manufacturing tolerances and/or thickness of a surface coating applied to the casing and/or rotor assembly, e.g. in an area adjacent to the blade tips when the turbomachine is assembled. Additionally, the desired tip clearance may include a clearance amount configured to account for the relative thermal expansions of the blades, the casings and the rotor assembly as the turbomachine heats up to operating temperatures.

As depicted in FIG. 4, each portion of the cutting path 404 for a particular blade may extend between an upstream cutting point 404*a* and a downstream cutting point 404*b*. As depicted, the upstream cutting point 404*a* may be upstream of a leading edge 406*a* of a stage of blades 410*a*, 410*b*, and the downstream cutting point 404*b* may be downstream of a trailing edge 406*b* of the stage of blades 410*a*, 410*b*, relative to the flow of gases through the turbomachine. The upstream and downstream cutting points may be defined by offsetting points on the gas path of the turbomachine upstream and downstream of the blade by the desired tip clearance. The cutting path, or cutting path portions 404 may be defined as straight lines between the upstream and downstream cutting points. Alternatively, the cutting path maybe a curved line extending between the upstream and downstream cutting points. For example, if the gas path is curved, the cutting path may comprise an offset portion of the gas path. The upstream and downstream cutting points 404*a*, 404*b* may be defined such that the cutting path portions 404 are suitable for machining blades 410*a*, 410*b* manufactured to substantially any desirable manufacturing tolerance.

In the arrangement depicted in FIG. 4, the cutting path comprises a plurality of cutting path portions 404. Each portion of the cutting path extends over a single stage of blades 410. In other words, each portion of the cutting path is configured such that the tips of a single stage of blades are machined by translating the cutting tool 470 of the machining apparatus along the portion of the cutting path. However, it is equally envisaged, that the cutting path may be configured to define the tip profile of more than one stage of blades. For example, the cutting profile may extend from an upstream cutting point, upstream of a first stage of blades, to a downstream cutting point, downstream of a second stage of blades. In some arrangements, a single cutting path may be configured to define the tip profiles of two, more than two or all of the stages of blades of the turbomachine, e.g. of a compressor and/or a turbine of the turbomachine.

Although it may be desirable to define the cutting path between points that are located upstream and downstream of the leading and trailing edges of the blade tip respectively, following machining of the blade tip, the points used to define the cutting path may not correspond to locations on the surface of the blade tip that have been machined. It may therefore be challenging to verify that the tips of the blades have been accurately machined to the cutting path.

Figure 6:
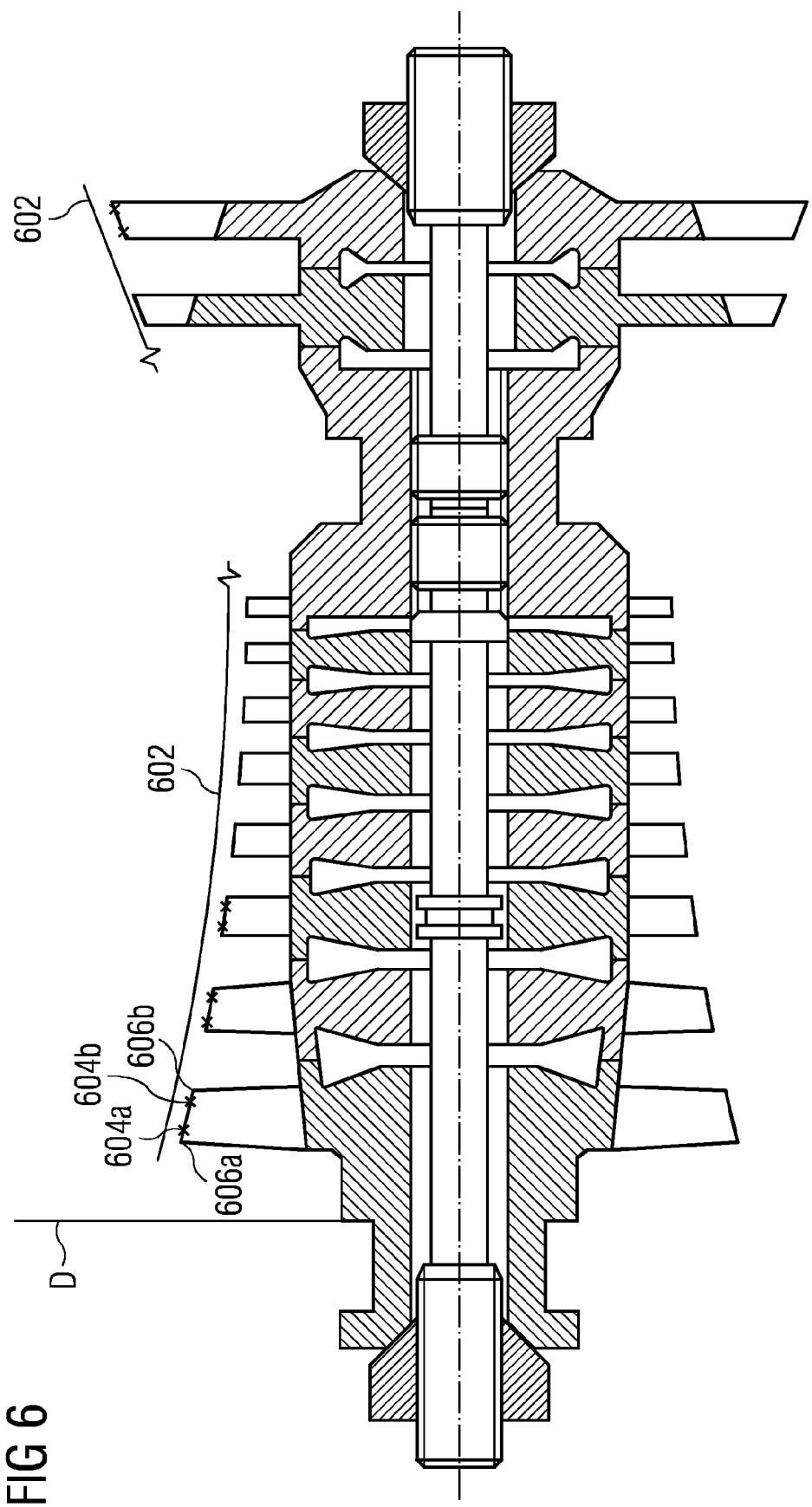
FIG. 6 is a cross sectional view of a rotor for a turbomachine, a gas path of the turbomachine and measurement points used to verify the position of the tip of the blades are also shown.

With reference to FIG. 6, in order to verify that the blade tip has been accurately machined according to the cutting path, upstream and downstream measurement points 604*a*, 604*b* may be defined. The upstream and downstream measurement points may be defined on the cutting path. For example, the upstream and downstream measurement points may be defined by offsetting a gas path 602, or points on the gas path 602, by the desired tip clearance, e.g. in a direction perpendicular to the gas path and/or casing and/or blade tip at that location.

As depicted in FIG. 6, the upstream measurement point 604*a* may be defined such that it is downstream of the leading edge 606*a* of the blades. In some arrangements, the upstream measurement point 604*a* may be defined such that it is downstream of the leading edge of the blades at all possible positions of the leading edge, e.g. according to manufacturing tolerances applied to the blades and/or the component of the turbomachine to which the blades are coupled. The downstream measurement point 604*b* may be defined such that it is upstream of the trailing edge 606*b* of the blades. In some arrangements, the downstream measurement point 604*b* may be defined such that it is upstream of the trailing edge of the blades at all possible positions of the trailing edge, e.g. according to the manufacturing tolerances applied to the blades and/or the component of the turbomachine.

The method 300 may further comprise a measurement step, in which the tip of one or more of the blades are measured at the upstream and downstream measurement points, e.g. to verify that the upstream and downstream measurement points substantially correspond to positions on the machining surface of the blade tip. Measurement of the upstream and downstream measurement point may be performed by touching a probe of the machining apparatus to the machined tip of the blade and determining a location of the tip of the blade in the coordinate system of the machining apparatus.

During operation of the turbomachine, the blades may become damaged or deteriorated. For example, particles within the gases flowing through the turbomachine may erode or abrade the surfaces of the blades and may roughen the surfaces of the blades, which may affect the performance of the turbomachine. Hence, following a period of operation of the turbomachine, it may be desirable to refurbish any deteriorated or damaged blades.

One or more of the blades coupled to the component in the first step 302 of the method 300 of machining a tip profile of the blade may be refurbished blades. The refurbished blades may be provided by removing the blade from a previously assembled turbomachine and refurbishing the blade, e.g. by removing material from the leading edge and/or tip of the blade. The cutting path 504, depicted in FIG. 5, may be configured such that it is suitable for machining refurbished blades, the dimensions of which may be outside of manufacturing tolerances applied to newly manufactured blades. For example, the upstream and/or downstream cutting point 504a, 504b may be positioned further upstream and downstream respectively than necessary for machining the tips of blades that have been manufactured to within the normal manufacturing tolerances.

After a period of operating a turbomachine, it may be desirable to refurbish blades that have previously been machined using the method 300. The blades may be refurbished, e.g. by removing material from the leading edge and/or tip of the blade, and the second and third steps 304, 306, of the method may be repeated using the same cutting path as used previously to machine the same tip profile. As the cutting path is machined relative to the datum face D of the component, machining the refurbished blades according to the cutting path may achieve the same tip clearances as with the newly manufactured blades.

In some situations, it may be desirable to replace the blades within one or more of the stages of blades with blades of a different design. For example, an alternative design of blades may have been designed, which may allow the efficiency or power output of the turbomachine to be improved. Although the design of the blades may be different, the gas path of the turbomachine may be unchanged. It may therefore be desirable to machine the blades with the same tip profile as used on previously designed blades in order to achieve substantially the same tip clearances.

As described above, when using previously proposed methods of machining the blade tip profile, the predetermined diameter to which the leading edge tip of the blade is machined depends on the expected axial position of the leading edge tip relative to the gas path. Hence, if this position changes, for example if the chord length or aerofoil twist angle of the blade changes, when the blades are redesigned, it may be necessary for the predetermined diameter to be redesigned and/or for the machining apparatus to be reconfigured.

If it is desirable to continue producing turbomachines comprising the previously designed blades as well as producing turbomachines comprising the redesigned blades, it may be necessary to reconfigure the machining apparatus frequently, e.g. whenever the production of turbomachines alternates between the previous and redesigned versions of the blades. This may reduce the rate at which turbomachines can be produced.

In contrast to this, by using the method 300 according to the present disclosure, the blades may be replaced with the redesigned blades, e.g. the redesigned blades may be coupled to the casing or rotor as appropriate, and the second and third steps 304, 306 of the method may be performed using the same cutting path. The tips of the redesigned blades may thereby be machined to the same tip profile as the previous blades without the machining apparatus being reconfigured.

When using the method 300, the cutting path may be configured such that the tips of a single stage of the blades are machined by performing the method 300. In this case, the datum face may be close, e.g. adjacent to a location at which the blades are coupled to the component. For example, if the blades are rotor blades, the datum face may be a machining datum face of a disc to which the blades are coupled.

Alternatively, with reference to FIG. 4, the cutting path 404 may be configured such that the tips of a plurality of stages of blades, such as 410a, 410b, are machined by performing the method 300. As described above, the cutting path 404 may be defined by offsetting a plurality of portions of the gas path. The datum face D may therefore be used as a reference for machining the tips of blades within a plurality of stages of rotor or stator blades. For example, as shown in FIG. 4, the datum face D may be used as the reference for machining the tip profiles of the blades in four stages of the turbomachine. The datum face D may be a face located towards one end of the component. The datum face D may located at one end of the cutting path, e.g. of each of the portions of the cutting path. Alternatively, the datum face may be a face located between, e.g. axially between, portions of the cutting path.

As depicted in FIG. 4, in some arrangements, the cutting path may comprise portions of the gas path of a compressor 490 and a turbine 495 of the turbomachine and the blades that are machined by using the method 300 may comprise at least one compressor blade 410a and at least one turbine blade 410b. In other arrangements, the tips of the compressor blades and the turbine blades may be machined separately, e.g. by performing the method 300 more than once.

Figure 7:
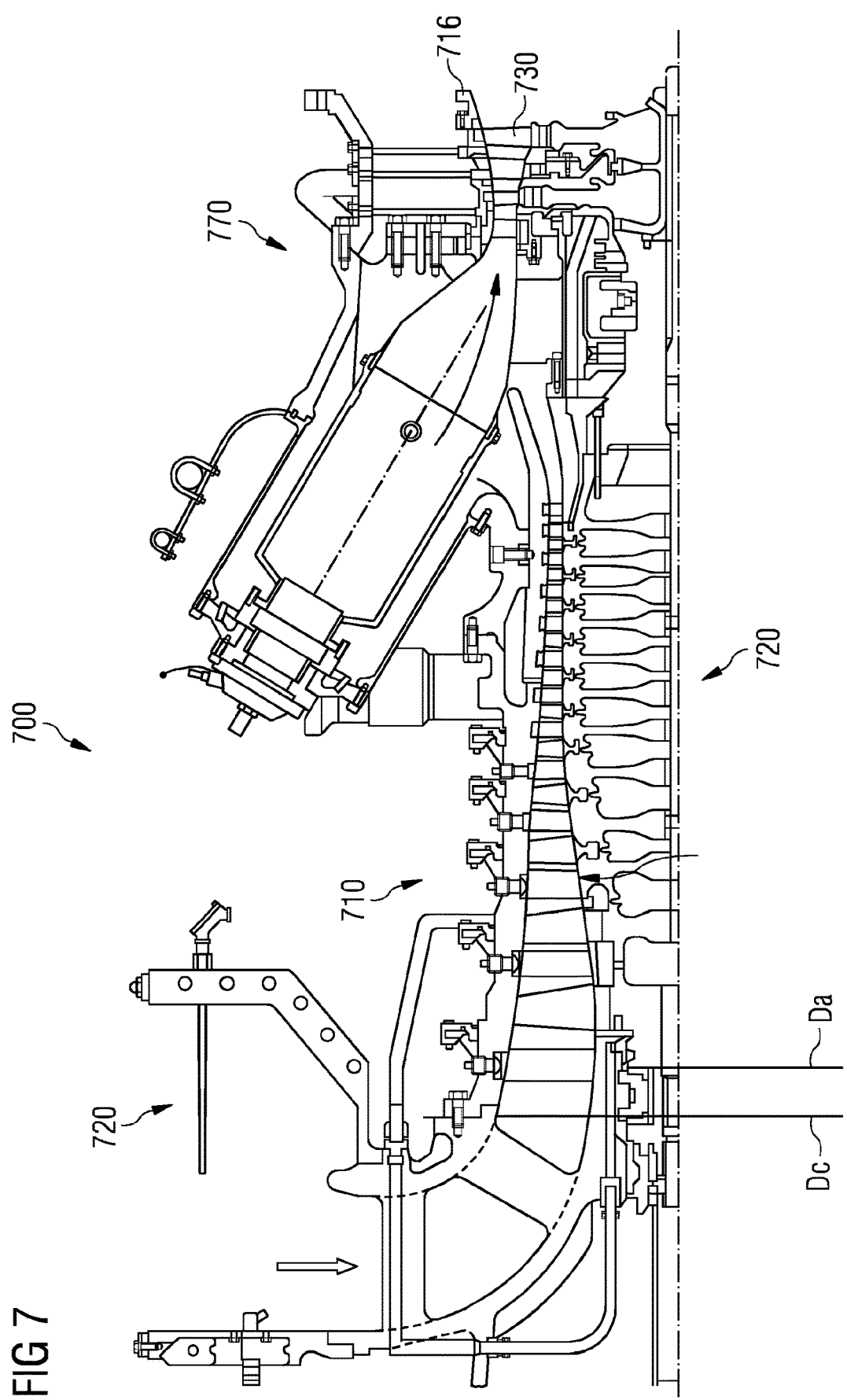
FIG. 7 is a cross section view of a previously proposed turbomachine.

With reference to FIG. 7, when a rotor assembly 720 and a casing assembly 710 of a turbomachine 700 are assembled together, the rotor assembly 720 may be positioned by adjusting the position of the thrust bearing face $D_R$ of the rotor relative to a machining datum face $D_C$ of an LP casing 712. In some arrangements, the relative positions of the rotor assembly 720 and the casing assembly 710 may be adjusted such that the tip clearance between a stage of rotor blades 730 and the casing assembly 710, e.g. a HP turbine casing 716 of the casing assembly, is within a threshold range. It may therefore be desirable to define the cutting paths used to machine the tip profiles of each stage of rotor and stator blades relative to the thrust bearing face $D_R$ of the rotor and the machining datum face $D_C$ of the casing respectively. The accuracy and consistency with which the tips of the blades in each of the stages of a compressor 760 and a turbine 770 of the turbomachine 700 are positioned relative to the adjacent components may thereby be increased.

In summary, the present method and system uses a fixed datum taken off the blade assembly from which co-ordinates (axial & radial) are specified to convey the path of blade tip cut, which in turn is derived from a master 'gas-path'. The fixed datum is the datum axial end face D of the component 110, 112, 114, 120, 124 and is aligned with the datum 462 of the coordinate system of the machining apparatus 450. The blade assembly is the coupled blade 130, 140 and respective component 110, 112, 114, 120, 124. The co-ordinates of the cutting path are derived from an axial position from the datum face D and a radial position from the rotational axis 122 of the blade assembly or turbomachine.

The present method and system uses the fixed datum and co-ordinates from the component to ensure machining of the blade tips is consistent regardless of variations in newly manufactured or refurbished blades and/or rotor disc. These variations can result in leading edge tip axial location errors or variation with respect to its assembled position within final engine assembly. The co-ordinates (axial and radial) of the present method are directly derived from the (master) 'gas-path' definition which defines both rotor and stator profiles for blade tips.

The present method is equally applicable to cantilever blades within stator assemblies and rotor blades. The present method and system is also highly advantageous for overhaul assemblies where blade cord lengths may have significantly changed due to erosion and hence moved the tip location axially. Such blades are re-used with weld repaired tips that require finish tip grinding or machining within the assembly to the method described.

The present method and system is advantageous where it is necessary to mix new blades with refurbished blades because these two types of blade may have different cord lengths; thus with the present method the tip clearances may be consistent regardless of blade type. For example, and referring to FIG. 1 which may be a final and conventional assembly, a newly manufactured blade may be represented by blade 10a having the leading edge tip 12a and a refurbished blade may be represented by blade 10c having the leading edge tip 12c. The two blades therefore define quite different tip clearances 14a and 14c. Tip clearance 14a leads to greater over-tip leakage and inefficiencies and tip clearance 14c can cause undesirable tip rubs with the casing and cause damage. Referring to FIG. 5 that may depict a newly manufactured blade 510b and a refurbished blade 510c, after applying the present method the tip clearance 514 of both these types of blades are the same.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A method of machining a tip profile of a plurality of blades for a turbomachine, the method comprising:
   coupling a plurality of blades to the component, such that the plurality of the blades are arranged in a plurality of stages spaced axially along the component;
   supporting the component on a machining apparatus, the machining apparatus being configured to remove material from the plurality of blades according to a cutting path defined within a coordinate system of the machining apparatus, wherein the component is supported such that a datum axial end face of the component is aligned with a datum of the coordinate system of the machining apparatus;
   selecting an axial location for the cutting path without regard for an actual axial location of the plurality of blades along the component of the turbomachine, wherein the axial location for the cutting path is defined relative to the datum of the coordinate system;
   defining the cutting path by an offsetting a portion of a boundary of a gas path of the turbomachine by a desired tip clearance amount, wherein the boundary of the gas path and the cutting path are defined relative to the datum axial end face of the component; and
   machining at least two blades of the plurality of blades according to the cutting path.

2. The method of claim 1, wherein the cutting path extends between an upstream cutting point and a downstream cutting point of the at least two blades, wherein the upstream cutting point is upstream of a leading edge of the respective blade of the at least two blades and the downstream cutting point is downstream of a trailing edge of the respective blade of the at least two blades.

3. The method of claim 1, wherein the method further comprises: measuring a tip of each of the at least two blades at an upstream measurement point and a downstream measurement point of each of the at least two blades, wherein the upstream measurement points and the downstream measurement points are defined on the cutting path, wherein each of the upstream measurement points are downstream of a leading edge of the respective at least two blades and each of the downstream measurement point are upstream of a trailing edge of the respective at least two blades.

4. The method of claim 1, wherein the method further comprises:
   removing the at least two blades from the turbomachine prior to the step of machining the at least two blades of the plurality of blades according to the cutting path, and then performing the step of machining the at least two blades of the plurality of blades according to the cutting path to create a plurality of refurbished blades by removing material from at least one of a leading edge and a tip of the at least two blades.

5. The method of claim 1, wherein the method further comprises:
   removing the at least two blades from the turbomachine prior to the step of machining the at least two blades of the plurality of blades according to the cutting path and then refurbishing the at least two blades by performing the step of machining the at least two blades of the plurality of blades according to the cutting path to form a plurality of refurbished blades, wherein each of the plurality of refurbished blades comprise a leading edge tip positioned along the cutting path that is different than a leading edge tip positioned along the cutting path of the respective blade prior to the step of machining according to the cutting path.

6. The method of claim 1, wherein at least one blade of the at least two blades of the plurality of the blades comprises a compressor blade and at least another one blade of the at least two blades of the plurality of the blades comprises a turbine blade.

7. The method of claim 1, wherein the method further comprises:
   assembling a rotor of the turbomachine into a casing of the turbomachine, wherein the rotor and the casing are located relative to one another according to a position of the datum axial end face.

8. The method of claim 1, wherein the component comprises a rotor or a casing of the turbomachine.

9. The method of claim 8, wherein the rotor or the casing is configured to be assembled with the other of the casing or the rotor of the turbomachine relative to the datum axial end face.

10. The method of claim 1, wherein the component comprises at least one of: a low pressure compressor rotor, a high pressure compressor rotor, a turbine rotor, a low pressure compressor casing, a high pressure compressor casing and a turbine casing.

11. The method of claim 1, wherein the cutting path extends between an upstream cutting point and a downstream cutting point and encompasses a range of possible axial locations of the at least two blades.

* * * * *